United States Patent
Hong (10) Patent No.: US 11,984,037 B2
(45) Date of Patent: May 14, 2024

(54) METHOD FOR PROVIDING FLIGHT ROUTE TO UNMANNED AERIAL VEHICLE, ACQUISITION METHOD AND DEVICE, AND SYSTEM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 460 days.

(21) Appl. No.: 17/271,917

(22) PCT Filed: Aug. 30, 2018

(86) PCT No.: PCT/CN2018/103361
§ 371 (c)(1),
(2) Date: Feb. 26, 2021

(87) PCT Pub. No.: WO2020/042120
PCT Pub. Date: Mar. 5, 2020

(65) Prior Publication Data
US 2021/0319704 A1    Oct. 14, 2021

(51) Int. Cl.
*G08G 5/00* (2006.01)
*B64C 39/02* (2023.01)
*B64U 101/20* (2023.01)

(52) U.S. Cl.
CPC .......... *G08G 5/006* (2013.01); *B64C 39/024* (2013.01); *G08G 5/003* (2013.01); *G08G 5/0069* (2013.01); *B64U 2101/20* (2023.01)

(58) Field of Classification Search
None
See application file for complete search history.

(56) References Cited

U.S. PATENT DOCUMENTS

| | | | |
|---|---|---|---|
| 10,049,587 | B2 | 8/2018 | Kalathil et al. |
| 2017/0311278 | A1 | 10/2017 | Adjakple et al. |
| 2017/0311290 | A1 | 10/2017 | Adjakple et al. |
| 2018/0005535 | A1 | 1/2018 | Kalathil et al. |
| 2018/0220486 | A1 | 8/2018 | Tseng et al. |

(Continued)

FOREIGN PATENT DOCUMENTS

| | | |
|---|---|---|
| CN | 108055697 A | 5/2018 |
| WO | WO 2018/036609 A1 | 3/2018 |

(Continued)

OTHER PUBLICATIONS

Nokia Networks: "Solution: Mobility Framework", SA WG2 Meeting #S2-113ah, S2-161323, Feb. 23-26, 2016, Sophia Antipolis, FR. 5 pages.

(Continued)

*Primary Examiner* — Richard A Goldman
*Assistant Examiner* — Charles Pall
(74) *Attorney, Agent, or Firm* — Finnegan, Henderson, Farabow, Garrett & Dunner, L.L.P.

(57) ABSTRACT

A method for providing a flight route to an unmanned aerial vehicle, includes: receiving, by first access network equipment, a radio resource control (RRC) connection resumption request sent by the UAV in an inactive state; and sending, by the first access network equipment, flight path information of the UAV to the UAV.

13 Claims, 4 Drawing Sheets

(56) References Cited

U.S. PATENT DOCUMENTS

2019/0116470 A1    4/2019  Balasubramanian et al.
2019/0289613 A1*   9/2019  Fanelli ................. G08G 5/0026
2020/0396715 A1*  12/2020  Wei .................... H04W 68/005

FOREIGN PATENT DOCUMENTS

WO    WO 2018/044365 A2    3/2018
WO    WO-2018036609 A1 *   3/2018

OTHER PUBLICATIONS

Extended European Search Report in European Application No. 18931507.0, mailed on Mar. 15, 2022.
English version of International Search Report in International Application No. PCT/CN2018/103361, mailed on Jun. 5, 2019.
English version of the Written Opinion of International Search Authority in the International Application No. PCT/CN2018/103361, mailed on Jun. 5, 2019.

\* cited by examiner

METHOD FOR PROVIDING FLIGHT ROUTE TO UNMANNED AERIAL VEHICLE, ACQUISITION METHOD AND DEVICE, AND SYSTEM

CROSS REFERENCE TO RELATED APPLICATIONS

This application is a national phase application based on International Application No. PCT/CN2018/103361, filed Aug. 30, 2018, the content of which is incorporated herein by reference.

TECHNICAL FIELD

The present disclosure generally relates to the field of communication, and more particularly, to a method and device for providing a flight path of an unmanned aerial vehicle (UAV), a method and device for acquiring a flight path of a UAV, and a system.

BACKGROUND

An unmanned aerial vehicle is referred to as a "UAV" for short. At present, the UAV has been used in many industries, such as vegetation protection, film and television shooting, surveying and mapping, scientific survey, power inspection, and the like.

A UAV flight includes two modes. One is a fixed mode, that is, the UAV flies according to a planned flight path. The other is a dynamic mode, that is, the UAV flies under real-time control of a controller.

For the fixed mode, how to acquire a flight route from a UAV management system for the UAV is an urgent problem to be solved.

SUMMARY

Embodiments of the present disclosure provide a method and device for providing a flight path of a UAV, a method and device for acquiring a flight path of a UAV, and a system, capable of solving a problem for a UAV to acquire a flight route from a UAV management system. The technical solution is as follows.

According to a first aspect of embodiments of the present disclosure, there is provided a method for providing a flight path of a UAV, which includes: receiving, by first access network equipment, a radio resource control (RRC) connection resumption request sent by the UAV in an inactive state; and sending, by the first access network equipment, flight path information of the UAV to the UAV.

Optionally, the RRC connection resumption request may be sent by the UAV when updating a radio access network (RAN) notification area (RNA).

Optionally, the method may further include: the first access network equipment receives the flight path information of the UAV from a UAV management system or core network equipment; and the first access network equipment stores the flight path information of the UAV.

Optionally, the method may further include: the first access network equipment receives the flight path information of the UAV from second access network equipment.

Optionally, the operation that the first access network equipment receives the flight path information of the UAV from the second access network equipment may include: the first access network equipment sends an information acquisition request to the second access network equipment, the information acquisition request being configured to request acquiring the flight path information of the UAV; and the first access network equipment receives the flight path information of the UAV from the second access network equipment.

Optionally, the operation that the first access network equipment sends the flight path information of the UAV to the UAV may include: the first access network equipment sends RRC connection release signaling to the UAV, the RRC connection release signaling including the flight path information of the UAV; or, the first access network equipment sends RRC connection resumption signaling to the UAV, the RRC connection resumption signaling including the flight path information of the UAV; or, after resuming an RRC connection with the UAV, the first access network equipment sends the flight path information of the UAV to the UAV through the RRC connection.

According to a second aspect of embodiments of the present disclosure, there is provided a method for acquiring a flight path of a UAV, which includes: sending, by the UAV, a radio resource control (RRC) connection resumption request to first access network equipment, the UAV being in an inactive state; and receiving, by the UAV, flight path information of the UAV from the first access network equipment.

Optionally, the operation that the UAV sends the RRC connection resumption request to the first access network equipment may include: the UAV sends the RRC connection resumption request to the first access network equipment when updating a radio access network (RAN) notification area (RNA).

Optionally, the operation that the UAV receives the flight path information of the UAV from the first access network equipment may include: the UAV receives RRC connection release signaling from the first access network equipment, the RRC connection release signaling including the flight path information of the UAV; or, the UAV receives RRC connection resumption signaling from the first access network equipment, the RRC connection resumption signaling including the flight path information of the UAV; or, after resuming an RRC connection with the first access network equipment, the UAV receives the flight path information of the UAV from the first access network equipment through the RRC connection.

According to a third aspect of embodiments of the present disclosure, there is provided a device for providing a flight path of a UAV, which is applied to first access network equipment and includes: a receiving module, configured to receive a radio resource control (RRC) connection resumption request sent by the UAV in an inactive state; and a sending module, configured to send flight path information of the UAV to the UAV.

Optionally, the RRC connection resumption request may be sent by the UAV when updating a radio access network (RAN) notification area (RNA).

Optionally, the device may further include a storing module. The receiving module may further be configured to receive the flight path information of the UAV from a UAV management system or core network equipment; and the storing module may be configured to store the flight path information of the UAV.

Optionally, the receiving module may further be configured to receive the flight path information of the UAV from second access network equipment.

Optionally, the sending module may further be configured to send an information acquisition request to the second access network equipment, the information acquisition request being configured to request acquiring the flight path information of the UAV. The receiving module may further be configured to receive the flight path information of the UAV from the second access network equipment.

Optionally, the sending module may be configured to: send RRC connection release signaling including the flight path information of the UAV to the UAV; or, send RRC connection resumption signaling including the flight path information of the UAV to the UAV; or, after resuming an RRC connection with the UAV, send the flight path information of the UAV to the UAV through the RRC connection.

According to a fourth aspect of embodiments of the present disclosure, there is provided a device for acquiring a flight path of a UAV, which is applied to a UAV and includes: a sending module, configured to send a radio resource control (RRC) connection resumption request to first access network equipment, the UAV being in an inactive state; and a receiving module, configured to receive flight path information of the UAV from the first access network equipment.

Optionally, the sending module may further be configured to send the RRC connection resumption request to the first access network equipment when updating a radio access network (RAN) notification area (RNA).

Optionally, the receiving module may be configured to: receive RRC connection release signaling from the first access network equipment, the RRC connection release signaling including the flight path information of the UAV; or, receive RRC connection resumption signaling from the first access network equipment, the RRC connection resumption signaling including the flight path information of the UAV; or, after resuming an RRC connection with the first access network equipment, receive the flight path information of the UAV from the first access network equipment through the RRC connection.

According to a fifth aspect of embodiments of the present disclosure, there is provided a device for providing a flight path of a UAV, which is applied to first access network equipment and includes: a processor; and a memory configured to store instructions executable by the processor.

The processor is configured to receive a radio resource control (RRC) connection resumption request sent by the UAV in an inactive state and send flight path information of the UAV to the UAV.

According to a sixth aspect of embodiments of the present disclosure, there is provided a device for acquiring a flight path of a UAV, which is applied to a UAV and includes: a processor; and a memory configured to store instructions executable by the processor.

The processor is configured to: send a radio resource control (RRC) connection resumption request to first access network equipment, the UAV being in an inactive state; and receive flight path information of the UAV from the first access network equipment.

According to a seventh aspect of embodiments of the present disclosure, there is provided a system for providing a flight path of a UAV, which includes first access network equipment and a UAV.

The first access network equipment includes the device in the third aspect, and the UAV includes the device in the fourth aspect; or the first access network equipment includes the device in the fifth aspect, and the UAV includes the device in the sixth aspect.

According to an eighth aspect of embodiments of the present disclosure, there is provided a non-transitory computer-readable storage medium having stored therein a computer program that, when executed by a processor, implements steps of the method in the first aspect, or implements steps of the method in the second aspect.

The technical solutions provided by embodiments of the present disclosure may include beneficial effects as follows.

The UAV in an inactive state sends an RRC connection resumption request to the access network equipment. Subsequently, during an RRC connection resumption flow or after an RRC connection has been resumed, the access network equipment sends the flight path information of the UAV to the UAV, thereby sending the flight path information of the UAV to cause the UAV to acquire the flight path information.

It is to be understood that the above general description and detailed description below are only exemplary and explanatory and not intended to limit the present disclosure.

BRIEF DESCRIPTION OF THE ACCOMPANYING DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A network architecture and a service scene are illustrated by embodiments of the present disclosure to illustrate a technical solution of embodiments of the present disclosure more clearly, and do not form a limitation to the technical solution of embodiments of the present disclosure. Those skilled in the art may know that, with evolution of the network architecture and emergence of a new service scene, the technical solutions provided by embodiments of the present disclosure may also apply to similar technical problems.

Figure 1:
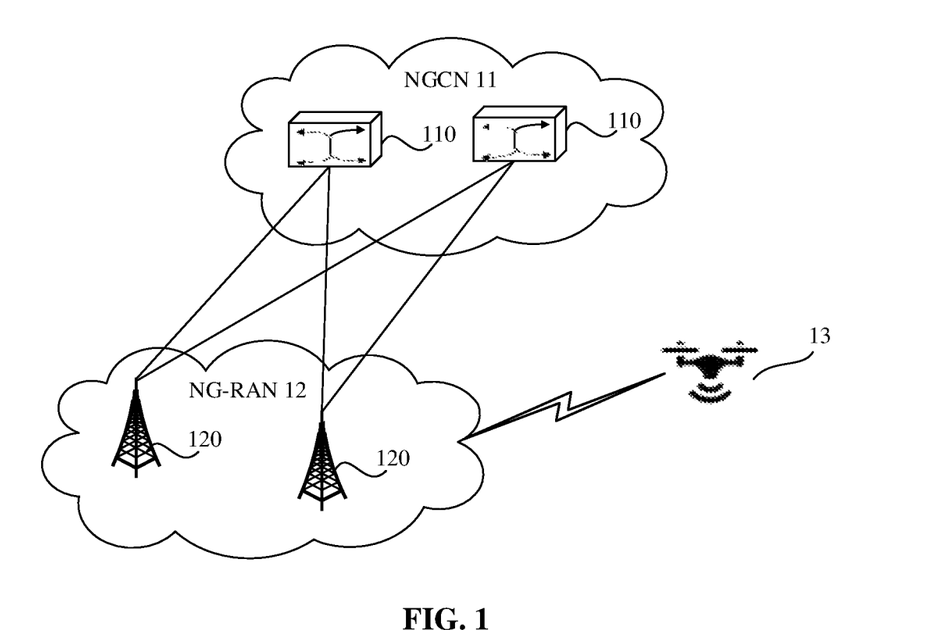
FIG. 1 is a diagram of a network architecture, according to an exemplary embodiment.

FIG. 1 is a diagram of a network architecture, according to an exemplary embodiment. The network architecture only takes a 5G system (also referred to as a new radio (NR)

system) as an example. The network architecture may include: a next generation core network (NGCN) 11, a new generation-radio access network (NG-RAN) 12, and a UAV 13.

The NGCN 11 is a core network of the 5G system. The core network includes a number of core network equipment 110. Core network equipment 110 mainly serves to provide a user connection, manage a user, and complete service bearing, serving as a bearing network providing an interface for an external network. For example, the NGCN 11 includes an access and mobility management function (AMF) entity, a user plane function (UPF) entity, and a session management function (SMF) entity.

The NG-RAN 12 is an access network of the 5G system. The access network includes a number of access network equipment 120. The access network equipment 120 and the core network equipment 110 communicate with each other through a certain air interface technology, such as an S1 interface. The access network equipment 120 may be a base station (BS). The BS is a device deployed in a RAN to provide a wireless communication function for a terminal. The BS may include various forms of macro BSs, micro BSs, relay stations, access points, and so on. In systems using different wireless access technologies, the name of a device with a BS function may differ. For example, in the 5G system, the device is called a gNodeB or a gNB. As communication technology evolves, the name "BS" may change. For ease of description, in embodiments of the present disclosure, the devices that provide wireless communication functions for terminals are collectively referred to as access network equipment.

The access network equipment 120 is configured to provide a service for the UAV 13. A wireless connection may be established between the UAV 13 and the access network equipment 120. For example, the UAV 13 and the access network equipment 120 communicate with each other through a certain air interface technology, such as cellular technology. The access network equipment 120 can control the UAV 13 through the wireless connection, and the UAV 13 can operate under the control of the access network equipment 120.

Optionally, in addition to providing a service for the UAV 13, the access network equipment 120 is also configured to provide a service for a terminal. The terminal may include various handheld equipment with wireless communication functions, onboard equipment, wearable equipment, computing equipment, or other processing equipment coupled to a wireless modem, as well as user equipment (UE), mobile stations (MS), terminal devices, and other device in various forms. For ease of description, any equipment mentioned above is collectively referred to as a terminal.

The UAV 13 is short for Unmanned Aerial Vehicle, which is an unmanned aircraft operated by radio remote control equipment and a self-provided program controlling device. The UAV is actually a blanket term for unmanned aircrafts, which may include: an unmanned fixed-wing aircraft, an unmanned vertical take-off and landing aircraft, an unmanned airship, an unmanned helicopter, an unmanned multi-rotor aircraft, an unmanned parawing aircraft, and the like.

The UAV 13 has been applied widely in fields such as aerial photography, agriculture, plant protection, mini-selfie, express transportation, disaster rescue, wild animal observation, infectious disease monitoring, surveying and mapping, news reporting, power inspection, disaster relief, film and television shooting, romantic creation, and the like. In order to further expand the application scope of the UAV 13, a relevant international standard organization has also established a project to study and standardize how to cause a cellular network to provide a demand-meeting service for the UAV 13.

A technical solution described in embodiments of the present disclosure may be applied to the 5G system, and may also be applied to 5G subsequent evolution systems.

Figure 2:
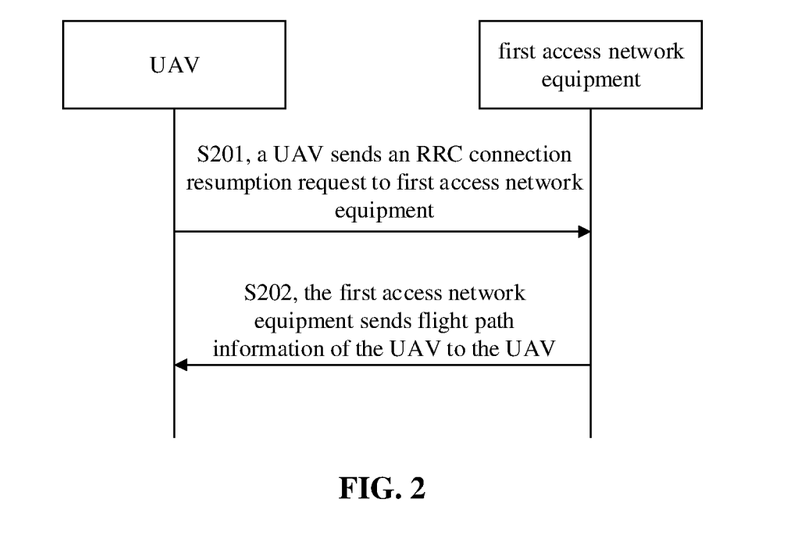
FIG. 2 is a flow chart showing a method for providing a flight path of a UAV, according to an exemplary embodiment.

FIG. 2 is a flow chart showing a method for providing a flight path of a UAV, according to an exemplary embodiment. The method may be applied to the network architecture illustrated in FIG. 1. The method may include steps as follows.

In step 201, a UAV sends a radio resource control (RRC) connection resumption request to first access network equipment.

In embodiments of the present disclosure, a technical solution is provided in which flight path information is passively provided for a UAV in an inactive state by access network equipment.

In embodiments of the present disclosure, the first access network equipment refers to access network equipment currently serving the UAV, that is, the access network equipment in the cell where the UAV is located.

An RRC connection may be established between access network equipment (such as the first access network equipment) and a UAV, and signaling and/or data may be transmitted through the RRC connection. Optionally, based on the state of the RRC connection, the state of the UAV may include: an idle state, a connected state, and an inactive state. The idle state means that an RRC connection has not been established between the UAV and the access network equipment. The connected state means that an RRC connection has been established between the UAV and the access network equipment, and the RRC connection is in an active state. The inactive state means that an RRC connection has been established between the UAV and the access network equipment, but the RRC connection is in an inactive state. When the UAV is in the inactive state, in order to interact with the access network equipment, the UAV first needs to resume the established RRC connection, and then interact with the access network equipment through the RRC connection.

The UAV in the inactive state may send an RRC connection resumption request to the first access network equipment, such as requesting to resume an RRC connection with the first access network equipment.

Optionally, the UAV in the inactive state sends an RRC connection resumption request (that is, RRCConnectionResumeRequest) to the first access network equipment when updating a radio access network (RAN) notification area (RNA).

When a UAV is in an inactive state, access network equipment (such as the first access network equipment) needs to know the RNA where the UAV is located. An RNA may include a cell range covered by one or more access network equipment. However, the RNA where the UAV is located may change at any time due to the mobility of the UAV. In this case, in order to cause the access network equipment to know the RNA where the inactive UAV is located, the UAV needs to update the RNA where the UAV is located. During updating the RNA by the UAV, the UAV may send an RRC connection resumption request to the access network equipment, so that the UAV may report RNA update information to the access network equipment.

Optionally, when a timer configured to periodically update the RNA expires, or when the RNA where the UAV is located changes, the UAV updates the RNA.

In step 202, the first access network equipment sends flight path information of the UAV to the UAV.

After receiving the RRC connection resumption request, the first access network equipment may decide whether to resume the RRC connection with the UAV. In addition, in embodiments of the present disclosure, the first access network equipment may also send flight path information to the UAV during the RRC connection resumption process or after the RRC connection has been resumed.

In embodiments of the present disclosure, the flight path information of the UAV may include a flight path of the UAV. For example, the flight path of the UAV may be a flight path planned for the UAV by a UAV management system, or a flight path planned for the UAV by core network equipment.

Optionally, the core network equipment is a mobility management network element in the core network. The mobility management network element is a functional network element responsible for access authentication and mobility management. For example, in the 5G system, the mobility management network element may be an AMF entity.

In a possible implementation, the first access network equipment receives the flight path information of the UAV from the UAV management system or the core network equipment, and stores the flight path information of the UAV. After that, when receiving the RRC connection resumption request sent by the UAV, the first access network equipment sends the flight path information of the UAV to the UAV.

Optionally, the core network equipment and the access network equipment interact through a communication interface. For example, in the 5G system, the communication interface may be an NG interface.

In another possible implementation, the first access network equipment receives the flight path information of the UAV from second access network equipment.

When the first access network equipment receives the RRC connection resumption request sent by the UAV, and yet the flight path information of the UAV is not stored in the first access network equipment, the first access network equipment may receive the flight path information of the UAV from the second access network equipment. The second access network equipment is access network equipment that is different from the first access network device and stores the flight path information of the UAV. The second access network equipment may receive and store the flight path information of the UAV from the UAV management system or the core network equipment. For example, the second access network equipment may be the last access network equipment ever serving the UAV. The UAV management system or the core network equipment sends the flight path information of the UAV to the second access network equipment. The second access network equipment stores the flight path information of the UAV.

After acquiring the flight path information of the UAV, the second access network equipment may inform the first access network equipment that the second access network equipment stores the flight path information of the UAV in a passive notification mode or an active notification mode.

In the passive notification mode, after receiving the RRC connection resumption request sent by the UAV, the first access network equipment sends an inquiry message for instructing to acquire the flight path information of the UAV to other access network equipment, so that one of the other access network equipment (such as the second access network equipment) that stores the flight path information of the UAV sends a response to the inquiry message to the first access network equipment, thereby informing the first access network equipment that the second access network equipment stores the flight path information of the UAV. After determining that the flight path information of the UAV is stored in the second access network equipment, the first access network equipment may request the second access network equipment for acquiring the flight path information of the UAV.

In the active notification mode, after receiving the flight path information of the UAV, the second access network equipment may send a notification message indicating that the second access network equipment stores the flight path of the UAV to other access network equipment. When receiving the notification message, the first access network equipment determines that the flight path information of the UAV is stored in the second access network equipment. Subsequently, when the first access network equipment needs to acquire the flight path information of the UAV, the first access network equipment may request the second access network equipment for acquiring the flight path information of the UAV.

Figure 3:
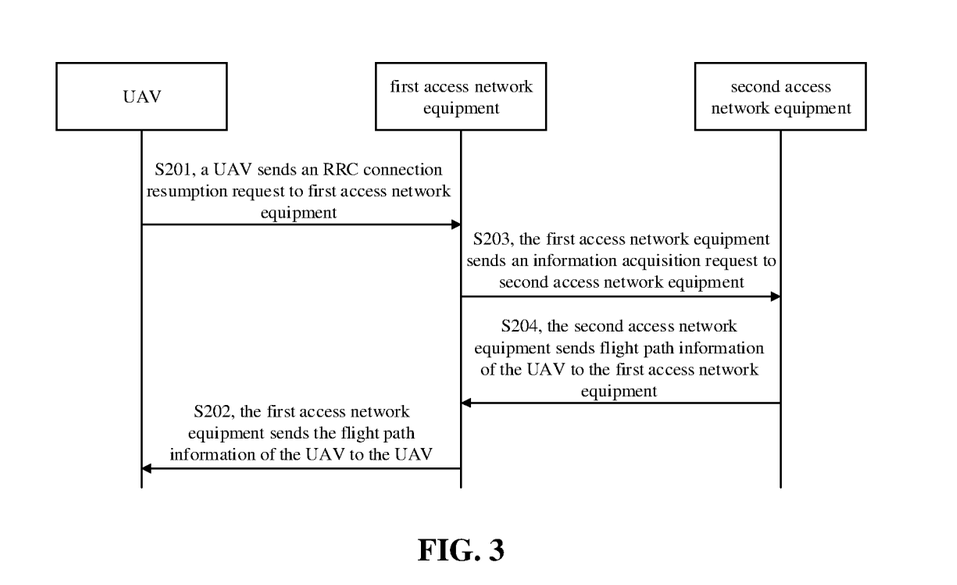
FIG. 3 is a flow chart showing a method for providing a flight path of a UAV, according to another exemplary embodiment.

FIG. 3 exemplarily shows a flow in which the first access network equipment receives the flight path information of the UAV from the second access network equipment. When the flight path information of the UAV is not stored in the first access network equipment, after receiving the RRC connection resumption request sent by the UAV, the first access network equipment first performs steps 203 and 204, and then performs step 202.

In step 203, the first access network equipment sends an information acquisition request to the second access network equipment.

When determining that the flight path information of the UAV is stored in the second access network equipment, the first access network equipment sends an information acquisition request to the second access network equipment, and the information acquisition request is configured to request acquiring the flight path information of the UAV. The information acquisition request may be a UE context acquisition request (i.e., RETRIEVE UE CONTEXT REQUEST), to acquire the context information of the UAV.

In step 204, the second access network equipment sends the flight path information of the UAV to the first access network equipment.

Optionally, after receiving the information acquisition request, the second access network equipment sends a UE context acquisition response (i.e., RETRIEVE UE CONTEXT RESPONSE) to the first access network equipment, and the UE context acquisition response includes the flight path information of the UAV.

Of course, in other possible implementations, the second access network equipment may also add the flight path information of the UAV in other signaling or preset signaling dedicated to transmitting the flight path information, which is not limited by embodiments of the present disclosure.

In addition, in embodiments of the present disclosure, the first access network equipment may send the flight path information of the UAV to the UAV in any mode as follows.

1. The first access network equipment sends RRC connection resumption (RRCConnectionResume) signaling to the UAV. The RRC connection release signaling includes the flight path information of the UAV.

For example, when the first access network equipment decides to resume the RRC connection with the UAV, the first access network equipment sends RRC connection resumption signaling to the UAV. At the same time, the first access network equipment may also add the flight path information of the UAV into the RRC connection resumption signaling and then send the signaling to the UAV, so that the UAV acquires the flight path information in time, which also helps to save signaling overhead.

2. The first access network equipment sends RRC connection release (RRCConnectionRelease) signaling to the UAV. The RRC connection resumption signaling includes the flight path information of the UAV.

For example, when the first access network equipment decides to disconnect the RRC connection with the UAV, the first access network equipment sends RRC connection release signaling to the UAV. At the same time, the first access network equipment may also add the flight path information of the UAV into the RRC connection release signaling and then send the signaling to the UAV, so that the UAV acquires the flight path information in time, which also helps to save signaling overhead.

3. After resuming an RRC connection with the UAV, the first access network equipment sends the flight path information of the UAV to the UAV through the RRC connection.

For example, after an RRC connection with the UAV has been resumed, the first access network equipment may send an RRC message to the UAV through the RRC connection, and the RRC message includes the flight path information of the UAV.

To sum up, in the technical solutions provided by embodiments of the present disclosure, a UAV in an inactive state sends an RRC connection resumption request to access network equipment. Subsequently, during an RRC connection resumption flow or after an RRC connection has been resumed, the access network equipment sends the flight path information of the UAV to the UAV, thereby sending the flight path information of the UAV to cause the UAV to acquire the flight path information.

It is to be noted that, in the above method embodiment, the technical solution of the present disclosure is introduced and explained only from the perspective of interaction between the first access network equipment and the UAV. Steps relating to the first access network equipment may be implemented separately as a method for providing a flight path of a UAV at the first access network equipment side. The steps relating to the UAV may be implemented separately as a method for acquiring a flight path of a UAV at the UAV side.

The following are device embodiments of the present disclosure, which may be used to implement the method embodiments of the present disclosure. Please refer to the method embodiments of the present disclosure for a detail not disclosed in device embodiments of the present disclosure.

Figure 4:
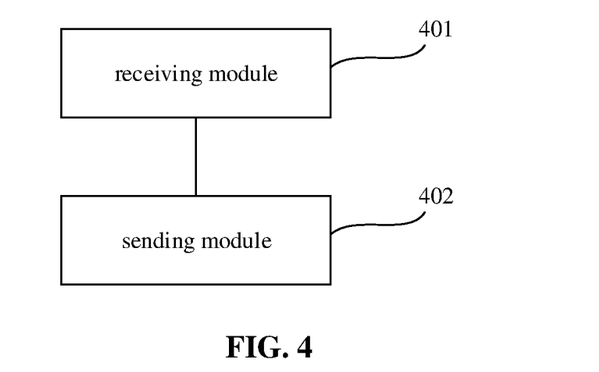
FIG. 4 is a block diagram of a device for providing a flight path of a UAV, according to an exemplary embodiment.

FIG. 4 is a block diagram of a device for providing a flight path of a UAV, according to an exemplary embodiment. The device functions to implement the above method example at the access network equipment side. The function may be implemented by hardware, or by hardware executing corresponding software. The device may be the first access network equipment introduced above, or may be set in the first access network equipment. The device may include a receiving module 401 and a sending module 402.

The receiving module 401 is configured to receive a radio resource control (RRC) connection resumption request sent by the UAV in an inactive state.

The sending module 402 is configured to send flight path information of the UAV to the UAV.

To sum up, in the technical solutions provided by embodiments of the present disclosure, a UAV in an inactive state sends an RRC connection resumption request to access network equipment. Subsequently, during an RRC connection resumption flow or after an RRC connection has been resumed, the access network equipment sends the flight path information of the UAV to the UAV, thereby sending the flight path information of the UAV to cause the UAV to acquire the flight path information.

In an optional embodiment provided based on the embodiment in FIG. 4, the RRC connection resumption request is sent by the UAV when updating a radio access network (RAN) notification area (RNA).

In another optional embodiment provided based on the embodiment in FIG. 4 or the above optional embodiment, the device further includes a storing module (not illustrated in the figure).

The receiving module 401 is further configured to receive the flight path information of the UAV from a UAV management system or core network equipment.

The storing module is configured to store the flight path information of the UAV.

In another optional embodiment provided based on the embodiment in FIG. 4 or the above optional embodiment, the receiving module 401 is further configured to receive the flight path information of the UAV from second access network equipment.

Optionally, the sending module 402 is further configured to send an information acquisition request to the second access network equipment, the information acquisition request being configured to request acquiring the flight path information of the UAV.

The receiving module 401 is further configured to receive the flight path information of the UAV from the second access network equipment.

In another optional embodiment provided based on the embodiment in FIG. 4 or any above optional embodiment, the sending module 402 is configured to send RRC connection release signaling to the UAV, the RRC connection release signaling including the flight path information of the UAV; or, send RRC connection resumption signaling to the UAV, the RRC connection resumption signaling including the flight path information of the UAV; or, after resuming an RRC connection with the UAV, send the flight path information of the UAV to the UAV through the RRC connection.

Figure 5:
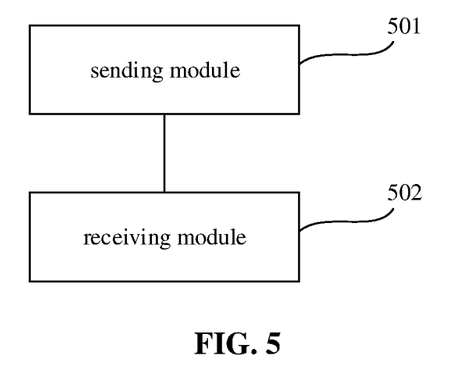
FIG. 5 is a block diagram of a device for acquiring a flight path of a UAV, according to an exemplary embodiment.

FIG. 5 is a block diagram of a device for acquiring a flight path of a UAV, according to an exemplary embodiment. The device functions to implement the above method example at the UAV side. The function may be implemented by hardware, or by hardware executing corresponding software. The device may be the UAV introduced above, or may be set in the UAV. The device may include a sending module 501 and a receiving module 502.

The sending module 501 is configured to send a radio resource control (RRC) connection resumption request to first access network equipment, the UAV being in an inactive state.

The receiving module 502 is configured to receive flight path information of the UAV from the first access network equipment.

To sum up, in the technical solutions provided by embodiments of the present disclosure, a UAV in an inactive state sends an RRC connection resumption request to access network equipment. Subsequently, during an RRC connection resumption flow or after an RRC connection has been resumed, the access network equipment sends the flight path information of the UAV to the UAV, thereby sending the flight path information of the UAV to cause the UAV to acquire the flight path information.

In an optional embodiment provided based on the embodiment in FIG. 5, the sending module 501 is further configured to send the RRC connection resumption request to the first access network equipment when updating a radio access network (RAN) notification area (RNA).

In another optional embodiment provided based on the embodiment in FIG. 5 or the above optional embodiment, the receiving module 502 is configured to receive RRC connection release signaling from the first access network equipment, the RRC connection release signaling including the flight path information of the UAV; or, receive RRC connection resumption signaling from the first access network equipment, the RRC connection resumption signaling including the flight path information of the UAV; or, after resuming an RRC connection with the first access network equipment, receive the flight path information of the UAV from the first access network equipment through the RRC connection.

Division of the functional modules in implementing the functions of the device according to the embodiments is merely illustrative. In application, the function may be allocated to be carried out by different functional modules as needed. That is, a content structure of the equipment may be divided into different functional modules for carrying out all or part of the function.

A module of the device according to any above embodiment herein may perform an operation in a mode elaborated in any above embodiment of the method herein, which will not be repeated here.

An exemplary embodiment of the present disclosure also provides a device for providing a flight path of a UAV, which can implement the method for providing a flight path of a UAV provided in the present disclosure. The device may be the first access network equipment introduced above, or may be set in the first access network equipment. The device may include a processor, and a memory configured to store instructions executable by the processor. The processor is configured to receive a radio resource control (RRC) connection resumption request sent by the UAV in an inactive state, and send flight path information of the UAV to the UAV.

Optionally, the RRC connection resumption request is sent by the UAV when updating a radio access network (RAN) notification area (RNA).

Optionally, the processor is further configured to receive the flight path information of the UAV from a UAV management system or core network equipment, and store the flight path information of the UAV.

Optionally, the processor is further configured to receive the flight path information of the UAV from second access network equipment.

Optionally, the processor is further configured to send an information acquisition request to the second access network equipment, the information acquisition request being configured to request acquiring the flight path information of the UAV; and receive the flight path information of the UAV from the second access network equipment.

Optionally, the processor is further configured to send RRC connection release signaling to the UAV, the RRC connection release signaling including the flight path information of the UAV; or, send RRC connection resumption signaling to the UAV, the RRC connection resumption signaling including the flight path information of the UAV; or, after resuming an RRC connection with the UAV, send the flight path information of the UAV to the UAV through the RRC connection.

An exemplary embodiment of the present disclosure further provides a device for acquiring a flight path of a UAV, which can implement the method for acquiring a flight path of a UAV provided in the present disclosure. The device may be applied to the UAV introduced above, or may be set in the UAV. The device may include a processor, and a memory configured to store instructions executable by the processor. The processor is configured to: send a radio resource control (RRC) connection resumption request to first access network equipment, the UAV being in an inactive state; and receive flight path information of the UAV from the first access network equipment.

Optionally, the processor is further configured to send the RRC connection resumption request to the first access network equipment when updating a radio access network (RAN) notification area (RNA).

Optionally, the processor is further configured to receive RRC connection release signaling from the first access network equipment, the RRC connection release signaling including the flight path information of the UAV; or, receive RRC connection resumption signaling from the first access network equipment, the RRC connection resumption signaling including the flight path information of the UAV; or, after resuming an RRC connection with the first access network equipment, receive the flight path information of the UAV from the first access network equipment through the RRC connection.

An exemplary embodiment of the present disclosure also provides a system for providing a flight path of a UAV, which includes the first access network equipment and the UAV introduced above.

A solution provided by embodiments of the present disclosure has been introduced herein mainly from a perspective of access network equipment and a UAV. It may be understood that, the access network equipment and the UAV include a hardware structure and/or a software module for implementing a function herein. Combining an exemplary unit as well as an exemplary algorithm step disclosed in embodiments of the present disclosure, embodiments of the present disclosure can be implemented by hardware or a combination of hardware and computer software. Whether a function is implemented by hardware or by computer software driven hardware may depend on a specific application of a technical solution as well as a design constraint. Depending on a specific application, those skilled in the art may implement a described function using different methods. Such implementation however should not be deemed going beyond the scope of the technical solutions provided by embodiments of the present disclosure.

Figure 6:
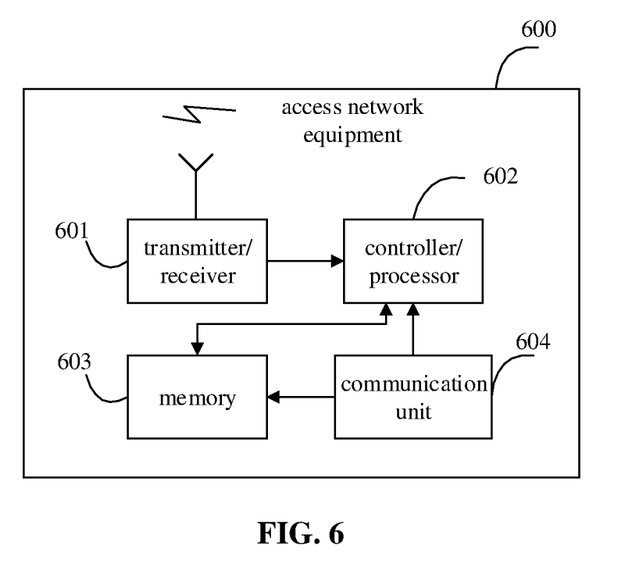
FIG. 6 is a structure schematic diagram of access network equipment, according to an exemplary embodiment.

FIG. 6 is a structure diagram of access network equipment, according to an exemplary embodiment.

The access network equipment 600 includes a transmitter/receiver 601 and a processor 602. The processor 602 may also be a controller, which is expressed as "controller/processor 602" in FIG. 6. The transmitter/receiver 601 is configured to support information sending and receiving between the access network equipment and the terminal in the above embodiment, and to support communication between the access network equipment and other network entities. The processor 602 performs various functions for communicating with the terminal. In an uplink, an uplink signal from the terminal is received via an antenna, demodulated by the receiver 601 (for example, a high-frequency signal is demodulated into a baseband signal), and further processed by the processor 602 to resume signaling information and service data sent by the terminal. In a downlink, service data and a signaling message are processed by the processor 602, and modulated by the transmitter 601 (for example, a baseband signal is modulated into a high-frequency signal) to generate a downlink signal, which is transmitted to the terminal via an antenna. It is to be noted that the demodulation or modulation function may also be completed by the processor 602. For example, the processor 602 is further configured to perform various steps at the access network equipment side (such as the first access network equipment and the second access network equipment) in the above method embodiments, and/or other steps of technology solutions described in embodiments of the present disclosure.

Furthermore, the access network equipment 600 may further include a memory 603. The memory 603 is configured to store data and a program code of the access network equipment 600. In addition, the access network equipment may further include a communication unit 604. The communication unit 604 is configured to support communication between the access network equipment and other network entities, such as network equipment and the like in a core network. For example, in the 5G system, the communication unit 604 may be an NG-U interface, configured to support communication between the access network equipment and a UPF entity. Alternatively, the communication unit 604 may also be an NG-C interface, configured to support communication between the access network equipment and an AMF entity.

It may be understood that FIG. 6 only shows a simplified design of the access network equipment 600. In practical applications, the access network equipment 600 may include any number of transmitters, receivers, processors, controllers, memories, communication units, and the like; and all access network equipment that can implement embodiments of the present disclosure may be within the scope of embodiments of the present disclosure.

Figure 7:
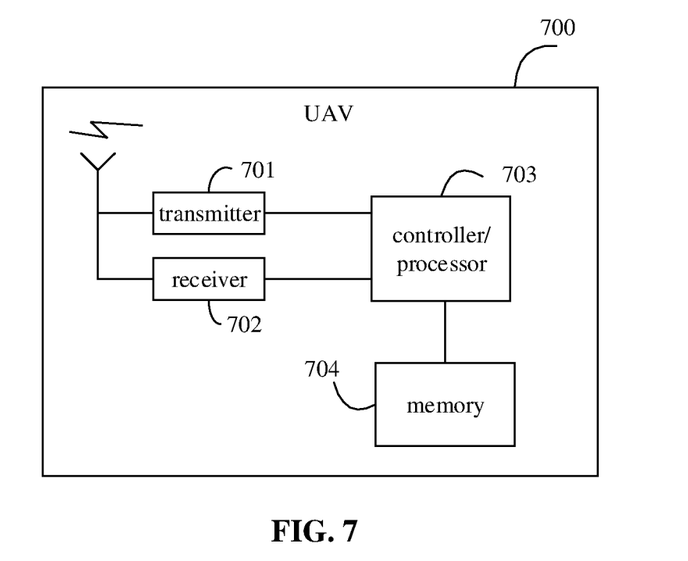
FIG. 7 is a structure schematic diagram of a UAV, according to an exemplary embodiment.

FIG. 7 is a structure diagram of a UAV, according to an exemplary embodiment.

The UAV 700 includes a transmitter 701, a receiver 702 and a processor 703. The processor 703 may also be a controller, which is expressed as "controller/processor 703" in FIG. 7.

The processor 703 controls and manages an action of the UAV 700, and is configured to execute a processing procedure performed by the UAV 700 in the above embodiments of the present disclosure. For example, the processor 703 is configured to execute steps at the UAV side in the above method embodiments, and/or other steps of technical solutions described in embodiments of the present disclosure.

Furthermore, the UAV 700 may further include a memory 704. The memory 704 is configured to store data and a program code for the UAV 700.

It may be understood that FIG. 7 only shows a simplified design of the UAV 700. In practical applications, the UAV 700 may include any number of transmitters, receivers, processors, controllers, memories, and the like; and all UAVs that can implement embodiments of the present disclosure may be within the scope of embodiments of the present disclosure.

Embodiments of the present disclosure also provide a non-transitory computer-readable storage medium having stored therein a computer program that, when executed by a processor of first access network equipment, implements steps of the above method for providing a flight path of a UAV.

Embodiments of the present disclosure also provide a non-transitory computer-readable storage medium having stored therein a computer program that, when executed by a processor of a UAV, implements steps of the above method for acquiring a flight path of a UAV.

It should be understood that herein by "multiple", it means two or more. A term "and/or" describes an association between associated objects, including three possible relationships. For example, for A and/or B, it may mean that there may be three cases, namely, only A, both A and B, or only B. The character "/" generally denotes an "or" relationship between two associated objects before and after the character.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for providing a flight path of an unmanned aerial vehicle (UAV), comprising:
   receiving, by first access network equipment, a radio resource control (RRC) connection resumption request sent by the UAV in an inactive state; and
   sending, by the first access network equipment, flight path information of the UAV to the UAV, comprising:
      sending, by the first access network equipment, RRC connection release signaling to the UAV, the RRC connection release signaling including the flight path information of the UAV.

2. The method of claim 1, wherein the RRC connection resumption request is sent by the UAV when updating a radio access network (RAN) notification area (RNA).

3. The method of claim 1, further comprising:
   receiving, by the first access network equipment, the flight path information of the UAV from a UAV management system or core network equipment; and
   storing, by the first access network equipment, the flight path information of the UAV.

4. The method of claim 1, further comprising:
   receiving, by the first access network equipment, the flight path information of the UAV from second access network equipment.

5. The method of claim 4, wherein receiving, by the first access network equipment, the flight path information of the UAV from the second access network equipment comprises:
   sending, by the first access network equipment, an information acquisition request to the second access network equipment, the information acquisition request being configured to request acquiring the flight path information of the UAV; and
   receiving, by the first access network equipment, the flight path information of the UAV from the second access network equipment.

6. A method for acquiring a flight path of an unmanned aerial vehicle (UAV), comprising:

sending, by the UAV, a radio resource control (RRC) connection resumption request to first access network equipment, the UAV being in an inactive state; and receiving, by the UAV, flight path information of the UAV from the first access network equipment, comprising:
receiving, by the UAV, RRC connection release signaling from the first access network equipment, the RRC connection release signaling including the flight path information of the UAV.

7. The method of claim 6, wherein sending, by the UAV, the RRC connection resumption request to the first access network equipment comprises:
sending, by the UAV, the RRC connection resumption request to the first access network equipment when updating a radio access network (RAN) notification area (RNA).

8. A device for providing a flight path of an unmanned aerial vehicle (UAV), applied to first access network equipment, comprising:
a processor; and
a memory configured to store instructions executable by the processor;
wherein the processor is configured to:
receive a radio resource control (RRC) connection resumption request sent by the UAV in an inactive state; and
send flight path information of the UAV to the UAV;
wherein the processor is further configured to:
send RRC connection release signaling to the UAV, the RRC connection release signaling including the flight path information of the UAV.

9. A device for acquiring a flight path of an unmanned aerial vehicle (UAV), applied to a UAV, comprising:
a processor; and
a memory configured to store instructions executable by the processor;
wherein the processor is configured to: perform the method of claim 6.

10. The method of claim 1, wherein sending, by the first access network equipment, the flight path information of the UAV to the UAV comprises:
sending, by the first access network equipment, RRC connection resumption signaling to the UAV, the RRC connection resumption signaling including the flight path information of the UAV.

11. The method of claim 1, wherein sending, by the first access network equipment, the flight path information of the UAV to the UAV comprises:
after resuming an RRC connection with the UAV, sending, by the first access network equipment, the flight path information of the UAV to the UAV through the RRC connection.

12. The method of claim 6, wherein receiving, by the UAV, the flight path information of the UAV from the first access network equipment comprises:
receiving, by the UAV, RRC connection resumption signaling from the first access network equipment, the RRC connection resumption signaling including the flight path information of the UAV.

13. The method of claim 6, wherein receiving, by the UAV, the flight path information of the UAV from the first access network equipment comprises:
after resuming an RRC connection with the first access network equipment, receiving, by the UAV, the flight path information of the UAV from the first access network equipment through the RRC connection.

* * * * *